United States Patent [19]

Rosaen

[11] Patent Number: 4,495,068
[45] Date of Patent: Jan. 22, 1985

[54] FLUID FILTERING DEVICE

[76] Inventor: Nils O. Rosaen, 5490 Waldon, Clarkston, Mich. 48016

[21] Appl. No.: 89,143

[22] Filed: Oct. 29, 1979

[51] Int. Cl.³ .............................................. B01D 27/10
[52] U.S. Cl. ..................................... 210/91; 210/130; 210/136; 210/223
[58] Field of Search ......... 210/91, 130, 136, DIG. 14, 210/452, 223, 238

[56] References Cited

U.S. PATENT DOCUMENTS 3,556,300  1/1971  Cudo ............................. 210/452 X
3,669,268  6/1972  Brown .................... 210/DIG. 14 X Primary Examiner—Frank A. Spear, Jr.
Attorney, Agent, or Firm—Gifford, VanOphem, Sheridan Sprinkle & Nabozny

[57] ABSTRACT

A filter assembly for detachable connection with a housing, comprising an elongated tubular filter element; and a holder assembly for the filter element, which includes a closure plate which engages one end of the filter element and an annular retainer which engages the other end. An elongated rod extending axially through the center of the filter element connects the closure member and annular member together so that the filter element is entrapped therebetween. The filter assembly is insertable through the open end of the housing and into the filter chamber so that the housing inlet is open through the annular retainer to the interior of the filter element. The filter element is spaced radially inwardly from the walls forming the filtering chamber thus defining an annular chamber which is fluidly connected to the housing outlet. A closure cap is then secured to and closes the end of the housing. An indicator cap is secured to the upper end of the rod and a portion of the indicator cap is received within an aperture formed through the closure cap and visible exteriorly of the housing. The indicator member provides an exterior signal that the filter element is contained and properly seated within the fluid filtering chamber. A bypass valve directly fluidly connects the housing inlet with the outlet when the differential pressure across the filter element exceeds a predetermined amount.

10 Claims, 3 Drawing Figures

FLUID FILTERING DEVICE

BACKGROUND OF THE INVENTION

I. Field of the Invention

The present invention relates generally to fluid filtering devices and, more particularly, to such a device adapted for connection with the return line of the hydraulic fluid system.

II. Description of the Prior Art

There are a number of previously known fluid filtering devices and many of these devices are particularly adapted for connection with a hydraulic fluid system. Such systems typically include a fluid reservoir fluidly connected by a suction line to a hydraulic pump. The outlet from the hydraulic pump is in turn connected to the hydraulic system which ultimately returns the hydraulic fluid to the reservoir via a return line. It is the conventional practice to connect a fluid filter to either the suction or return line of the hydraulic system in order to remove unwanted debris from the hydraulic fluid. Otherwise, this debris enters and can damage the hydraulic system.

These previously known hydraulic fluid filtering devices typically comprise a housing having an inlet port and an outlet port with a fluid filtering chamber defined within the interior of the housing. A filter element is then removably positioned through a housing opening into the filter chamber so that, upon doing so, the filter element is fluidly positioned in between the inlet and outlet ports. A closure cap then covers the housing opening and retains the filter element in position. In addition, many of these previously known fluid filtering devices include a bypass valve means for directly fluidly connecting the inlet port with the outlet port at a predetermined differential pressure across the filter element indicative of excessive filter element clogging.

These previously known fluid filtering devices, however, suffer from a number of different disadvantages. One disadvantage of these previously known devices is that workmen, either intentionally or through inadvertence, neglect to insert the filter element within the filter chamber and instead simply connect the closure cap across the housing opening. By doing this, however, the fluid inlet port is directly connected with the outlet port so that debris entrained within the hydraulic fluid passes directly to the hydraulic system. As previously described, such debris can damage the components of the hydraulic system.

A still further disadvantage of these previously known fluid filtering devices with bypass valve assemblies is that the differential pressure across the filter element at which the bypass valve assembly opens is preset upon the manufacture of the fluid filtering device and cannot be adjusted or reset once the device is installed in a hydraulic fluid system. Moreover, many of these previously known bypass valve assemblies are mounted directly to the device housing so that the entire device must be removed from the fluid system and disassembled when repair or replacement of the bypass valve assembly is required. Such removal of the entire fluid filtering device is not only expensive and time consuming to accomplish but also results in excessive downtime for the entire hydraulic system.

A still further disadvantage of these previously known fluid filtering devices is that such devices have not proven entirely satisfactory in removing metallic particles from the hydraulic fluid and this is particularly true when the fluid filtering device is in a fluid bypass condition. Hydraulic fluid systems are particularly susceptible to damage from metal particles, chips and filings in the hydraulic fluid.

SUMMARY OF THE PRESENT INVENTION

The present invention overcomes all of the above mentioned disadvantages of the previously known fluid filtering devices.

In brief, the fluid filtering device according to the present invention comprises a housing having an inlet port and outlet port and defining an elongated interior fluid filtering chamber. A housing opening provides access to the top of the filter chamber.

A fluid filter assembly is provided for detachable connection with the housing and includes an elongated tubular filter element open at each axial end and a holder assembly for the filter element. The holder assembly further includes an elongated rod which extends axially through the center of the tubular filter element and protrudes outwardly from both the upper and lower end of the filter element. An indicator member is secured to the upper axial end of the rod and is attached by a bracket to an annular retainer which abuts against the upper axial end of the filter element. A bypass valve assembly is detachably connected to the lower end of the rod and includes an annular bypass valve seat which abuts against the lower end of the filter element so that the filter element is entrapped between the annular retainer and the bypass valve seat.

The filter assembly is dimensioned so that it can be inserted through the housing opening and so that the filter element is positioned within the fluid filtering chamber. An annular abutment surface in the housing limits the inward travel of the fluid filter element while a seal member engages and fluidly seals the upper end of the filter element to the housing. Moreover, the filter element is spaced radially inwardly from the walls of the housing thus defining an annular chamber and this annular chamber is fluidly connected to the housing outlet. The fluid inlet is open to the interior of the filter element via the upper annular retainer so that during the normal operation of the filter device, fluid flows from the inlet into the interior of the filter element. From the interior of the filter element the fluid passes through the filter element, into the annular chamber and out through the fluid outlet.

A closure cap is provided for fluidly closing the housing opening after the filter assembly has been inserted into the housing in the previously described fashion. The closure cap includes a central opening into which a portion of the indicator member is received and visible exteriorly of the housing. Moreover, the lower end of the rod is spaced upwardly from the bottom of the fluid filtering chamber so that in the event that the filter element is omitted from the filter assembly, the indicator member drops downwardly from the closure cap aperture into the fluid chamber and thus provides an exteriorly visible signal that the filter element is not properly positioned within the fluid filtering chamber.

In norder to remove metallic particles from the fluid, in the preferred form of the invention, a plurality of annular magnets are secured to the rod and within the interior of the filter element. Metallic particles present in the hydraulic fluid are thus attracted and adhere to the magnets even though the fluid filtering device is in a bypassing condition as will be shortly described.

The present invention also provides an improved bypass valve assembly in which the differential pressure across the filter element at which bypassing begins is adjustable. The bypass valve assembly comprises the annular bypass valve seat which abuts against the bottom of the filter element. The bypass valve seat further includes a tubular stem which extends coaxially outwardly from the filter element and is slidably positioned around the lower end of the rod. An annular bypass valve member is in turn slidably positioned over the stem and, when it abuts the bypass valve seat, prevents fluid bypassing.

The valve member is resiliently urged against the bypass valve seat by a helical spring which is entrapped on the stem by a spring retainer threadably secured to the stem. The amount of compression of the helical spring, and thus the pressure at which the bypass valve will open, can be simply and infinitely adjusted by varying the position of the spring retainer on the stem.

The bypass valve assembly according to the present invention is further advantageous in that it is removed from the fluid filtering device housing along with the filter assembly rather than being directly connected to the housing. Thus, when repair or replacement of the bypass valve assembly is required, the filter assembly can be simply removed from the housing and a new filter assembly reinserted in its place. Consequently, the downtime for the hydraulic fluid system is kept to an absolute minimum.

BRIEF DESCRIPTION OF THE DRAWING

A better understanding of the present invention will be had upon reference to the following detailed description when read in conjunction with the accompanying drawing wherein like reference characters refer to like parts throughout the several views, and in which.

DETAILED DESCRIPTION OF THE PRESENT INVENTION

Figure 1:
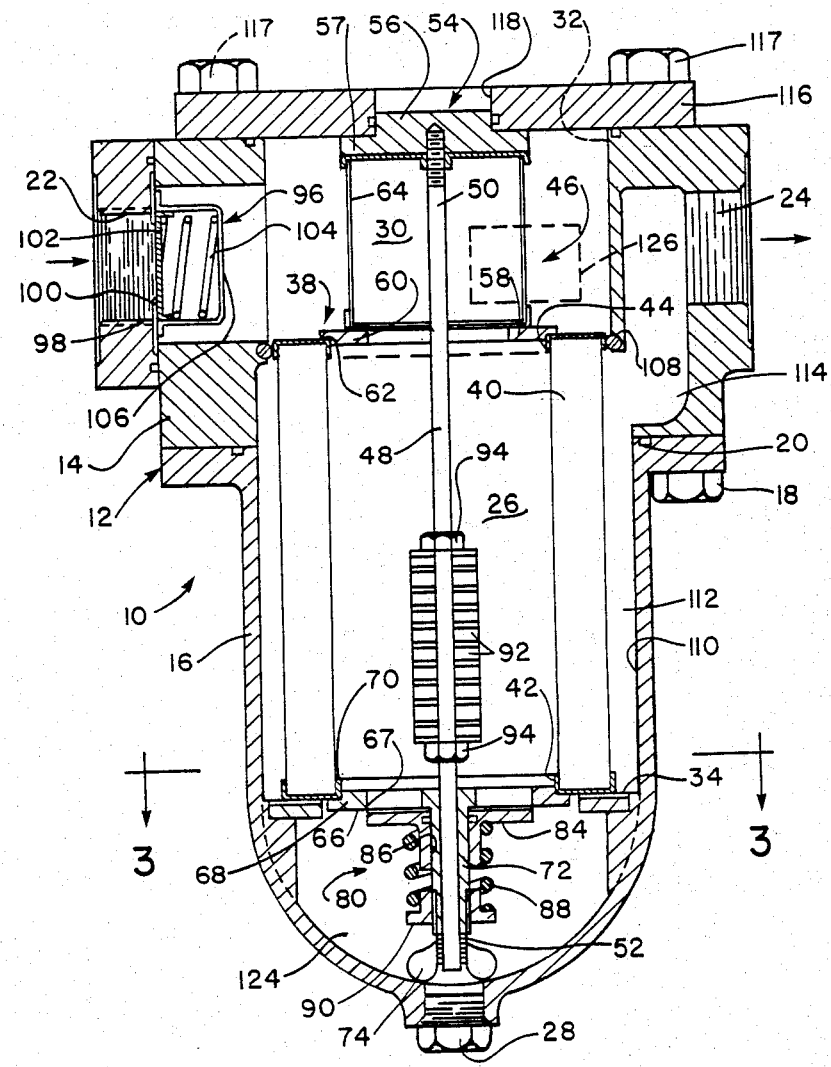
FIG. 1 is a longitudinal sectional view of the fluid filtering device of the present invention.

With reference to FIG. 1, the fluid filtering device 10 according to the present invention is thereshown and comprises a housing 12 having an upper part 14 and a lower part 16. The housing parts 14 and 16 are secured together by bolts 18 (only one of which is shown) and a conventional seal element 20 is positioned between the housing parts 14 and 16 to prevent fluid leakage between them.

The upper housing part 14 includes a fluid inlet 22 and a fluid outlet 24. Both the inlet 22 and outlet 24 are internally threaded to receive conventional fluid fittings (not shown). The lower housing part 16 is generally tubular and cylindrical in shape thus defining an elongated and generally cylindrical fluid filtering chamber 26. The chamber 26 is closed at its lower end by a drain plug 28 secured to the lower housing part 16 and, at its upper end, is open to the fluid inlet 22 via a fluid inlet chamber 30. The upper housing part 14 also has an upper opening 32 above the fluid inlet chamber 30 which is open to and axially aligned with the fluid filtering chamber 26.

The second housing part 16 also includes a plurality of inwardly protruding abutment members 34 near its lower end which protrude inwardly into the fluid filtering chamber 26. The members 34 are circumferentially spaced from each other (FIG. 3) and thus form fluid passageways 36 between the members 34 for a reason to be hereinafter described.

The present invention further includes a filter assembly 38 having a tubular filter 40 open at both its lower end 42 and upper end 44 and a holder assembly 46 for holding the filter element 40.

The holder assembly 46 further includes an elongated and externally threaded rod 48 which extends axially through the filter element 40 and protrudes outwardly from the filter element 40 at both its upper end 50 and its lower end 52. An indicator member 54 having an upper raised and preferably cylindrical central portion 56 and a lower flange portion 57 is attached to the upper end 50 of the rod 48.

An annular retainer 58 having a central opening 60 and an axially extending portion 62 is secured to the indicator member 54 by a U-shaped bracket 64. The retainer 58 abuts against the upper end 44 of the tubular filter element 40 while the axially extending portion 62 of the retainer 58 ensures that the retainer 58 remains properly positioned against the filter element 40.

Figure 2:
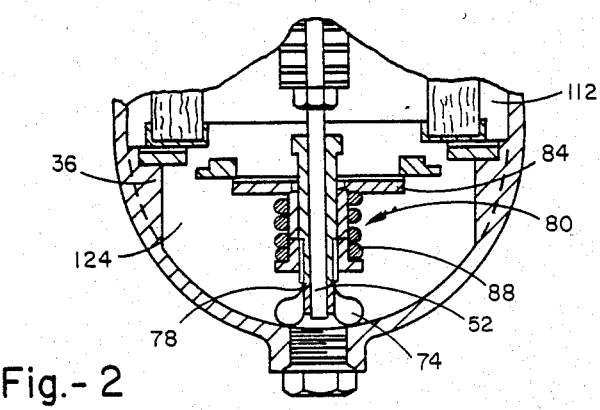
FIG. 2 is a fragmentary sectional view illustrating the fluid bypassing means.
Figure 3:
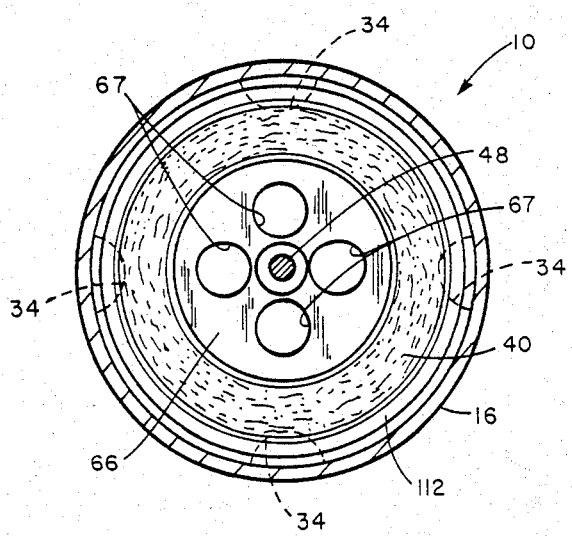
FIG. 3 is a cross sectional view taken substantially along line 3—3 in FIG. 1.

With reference to FIGS. 1–3, the holder assembly 46 further includes a retainer 66 having ports 67 for securing the lower end 42 of the filter element 40 to the rod 48. The retainer 66 includes a radial flange portion 68 which abuts against the lower axial end of the filter element 40 and an axially extending portion 70 which is received within the interior element 40 to hold the retainer 66 coaxially aligned with the element 40. An elongated tubular stem 72 attached to the retainer is slid over the lower end 52 of the rod 48 so that the stem 72 protrudes axially outwardly and downwardly from the filter element 40. A wing nut 74 threadably engages the lower end 52 of the rod 48 and abuts against the lower axial end 78 of the retainer stem 72. Upon tightening the wing nut 74, the filter element 40 is sandwiched and entrapped between the upper retainer 58 and the lower retainer 66. The filter element 40, however, can be rapidly removed from the holder assembly 46 by merely unscrewing the wing nut 74 and removing the retainer 66. Moreover, the retainer 66 is normally closed as will become shortly apparent.

In the preferred form of the invention, the lower retainer 66 also forms the valve seat for a bypass valve assembly 80. In this event, a circular bypass valve member 84 having a central bore 86 is slid over the stem 72 and abuts against the valve seat 66 in order to fluidly close the opening 82. A helical spring 88 is trapped in a state of compression between the valve member 84 and a spring retainer 90 which is threadably secured to the stem 72 resiliently urges the valve member 84 against its seat. Moreover, the compression of the spring 88 can be simply adjusted by adjusting the position of the spring retainer 90 which in turn adjusts the opening pressure of the bypass valve assembly 80.

Referring again to FIG. 1, in order to remove metal particles from the fluid, preferably a plurality of annular permanent magnets 92 are coaxially positioned around the rod 48 and secured in place within the interior of the filter element 40 by locking nuts 94. Since the entire rod 48 is externally threaded, the number and axial position of the permanent magnet 92 can be easily adjusted as required or desired.

A one-way valve assembly 96 is also preferably operatively positioned within the inlet 22 of the filter device 10. The one-way valve 96 can be of any conventional construction but, as shown, comprises a valve seat 98 having a central opening 100 and disposed across the inlet 22. A valve member 102 is urged against the valve seat 98 by a spring 104 held in place by a U-shaped bracket 106. The spring 104 has a relatively low spring constant in order to permit the free flow of fluid from the inlet 22 and to the inlet chamber 30. However, the spring 104 immediately closes the one-way valve 96 in the event of a reverse or back fluid pressure.

The entire filter assembly 38 is adapted to be inserted through the housing opening 32 and into the filter chamber 26 so that the lower end of the filter element 40 abuts against the annular stop member 34. An annular seal member 108 simultaneously sealingly engages the upper end of the tubular filter element 40. Moreover, the tubular filter element 40 is spaced radially inwardly from the interior walls 110 of the lower housing part 16 thus forming an annular chamber 112. This annular chamber 112 is fluidly connected by an outlet passage 114 to the fluid outlet 24.

With the filter assembly 38 positioned in the housing 12 in the above described fashion, a closure cap 116 is secured to the upper housing part 14 by bolts 117 across the upper housing opening 32. The closure cap 16 includes a central opening 118 into which the raised portion 56 of the indicator member 54 is received and visible exteriorly of the housing 12. A portion of the closure cap 116 also abuts against the annular flange 57 on the indicator member 54 and axially locks the filter assembly 38 in place.

In operation, fluid flows into the inlet 22, through the one-way valve 96 and into the inlet chamber 30. From the inlet chamber 30, the fluid passes into the interior of the filter element 40 via the retainer opening 60 and flows outwardly through the filter element 40, into the inner chamber 112 and to the fluid outlet 24. During normal operation of the filter device 10, the valve spring bypass 88 urges the valve member 84 against its seat 66 and thus fluidly closes the lower end 42 of the filter element 40.

As the filter element 40 removes debris from the fluid, the differential across the filter element 40 increases in the well known manner. At a predetermined pressure determined by the position of the spring retainer 90 and thus the compression of the spring 88, the bypass valve member 84 shifts downwardly towards the spring retainer 90 to the position shown in FIG. 2. Upon doing so, a portion of the influent passes through the ports 67 and into a chamber 124 beneath the filter element 40. From the chamber 124 the fluid passes through the fluid passageway 36 and into the annular chamber 112 thus completely bypassing the filter element 40.

If desired, the fluid filtering device 10 can include a pressure indicator 126 (FIG. 1) secured to the housing and which detects either the absolute pressure in the inlet chamber 30 or, alternatively, the differential pressure across the filter element 40. The indicating means 126 includes an indicator member (not shown) the position of which is indicative of the pressure in the inlet chamber 30 and thus of the degree of clogging of the filter element 40.

When replacement of the filter element 40 is required, the closure cap 116 is removed from the housing and the entire filter assembly 38 is removed from the housing by grasping the indicator element 54. The dirty filter element 40 is then removed from the holder assembly 46 by unscrewing the wing nut 74 and removing the lower annular retainer 66. A new filter element 40 is then positioned on the holder assembly 46, the annular retainer 66 and wing nut 74 are reattached to the rod 48 and the entire filter assembly 38 is repositioned via the housing opening 32 into the filter chamber 26.

It can thus be seen that the fluid filtering device 10 according to the present invention is highly advantageous in that it permits the fluid pressure at which bypassing of the filter element begins to be simply and rapidly adjusted by merely adjusting the position of the spring retainer 90. Moreover, since the entire bypass valve assembly is removable with the filter assembly 38, repair or replacement of the bypass valve assembly 80 does not require the removal of the housing 12 from the fluid system. In addition, the replacement of the filter element does not affect the adjustment of the bypass valve means.

A still further advantage of the fluid filtering device according to the present invention is that the annular magnets 92 effectively remove metal particles from the influent. Once removed, these metal particles can be easily removed from the magnets 92 by merely wiping the magnets 92 with a cloth. Moreover, the magnets 92 continue to remove metal particles from the influent even when the filter device 10 is in a bypass condition.

A still further advantage of the filter device 10 according to the present invention is that the raised portion 56 of the indicator member 54 is visible through the cap opening 118 when the filter element 40 is properly positioned within the filter chamber 26. In the event that the filter element 40 is omitted from the filter assembly 38, the indicator cap 54 will drop downwardly from the opening 118 since the lower end of the rod 48 is spaced upwardly from the bottom of the chamber 124. The displacement of the indicator cap 54 from the cap opening 118 is also visible exteriorly of the housing and thus can be rapidly detected and rectified.

Having described my invention, however, many modifications thereto will become apparent to those skilled in the art to which it pertains without deviation from the spirit of the invention as defined by the scope of the appended claims.

I claim:

1. A fluid filtering device comprising:
a housing having a filter chamber, said housing having a first fluid port open to a first end of the filter chamber and a second fluid port open to said filter chamber, said housing having an opening which is open to said first end of the filter chamber;
a filter assembly comprising a tubular filter element open at each end and a holder assembly for the filter element, said holder assembly comprising a closure member for engaging and closing one end of the filter element, an annular member for engaging the other end of the filter element and means for detachably connecting said closure member to said annular member so that the filter element is entrapped therebetween, a part of said detachable connection means forming a hand gripping portion for manipulating the filter assembly;
said filter assembly being insertable through the housing opening by said hand gripping portion so that said filter element is positioned within said filter chamber and so that the other end of the filter element is open to said first port, said filter element being spaced radially inwardly from said housing thus forming an annular chamber, said annular chamber being open to said second port;

means for sealing said other end of said filter element to said housing; and means for closing the open end of said housing.

2. The invention as defined in claim 1 wherein said connecting means comprises an elongated rod extending axially through said filter element, said rod being connected at one end to said annular member and said closure member being detachably connected to the other end of said rod.

3. The invention as defined in claim 2 wherein said closing means comprises a closure cap detachably connectable to said housing, said closure cap having an aperture formed through it and said filter device further comprising an indicator member secured to said one other end of the rod, at least a portion of said indicator member being positioned in said closure cap aperture when said filter element is positioned in said filter chamber.

4. The invention as defined in claim 2 and further comprising at least one magnet secured to said rod in said filter chamber to remove metal particles from the fluid.

5. The invention as defined in claim 3 and further comprising a seat secured to said housing in said filter chamber which abuts against said one end of said filter element and limits the insertion of said filter element into said filter chamber, said one end of said rod being spaced upwardly from the other end of the filter chamber by an amount sufficient so that upon removal of the filter element from the holder assembly, said portion of said indicator member drops from said closure cap aperture.

6. The invention as defined in claim 1 wherein said closure member further comprises bypass means for directly fluidly connecting said fluid ports together when the fluid pressure of one of said ports exceeds a predetermined value.

7. The invention as defined in claim 6 wherein said closure member further comprises a valve seat which abuts against said one end of said filter element, a valve member and means for resiliently urging said valve member against said valve seat.

8. The invention as defined in claim 7 wherein said resilient means comprises a compression spring and means for adjusting the compression of said spring.

9. The invention as defined in claim 8 wherein said valve seat includes an elongated tubular stem which protrudes axially outwardly from said valve seat and wherein said means for adjusting the compression of said spring comprises a spring retainer threadably secured to said stem, said spring being entrapped between said valve member and said spring retainer.

10. The invention as defined in claim 1 wherein said first port is an inlet port and further comprising a one-way check valve in said inlet port.

* * * * *